United States Patent [19]

Trcka

[11] 4,245,242

[45] Jan. 13, 1981

[54] CONTRAST ENHANCEMENT OF MULTICOLOR DISPLAYS

[75] Inventor: James S. Trcka, Cedar Rapids, Iowa

[73] Assignee: Rockwell International Corporation, El Segundo, Calif.

[21] Appl. No.: 37,789

[22] Filed: May 10, 1979

[51] Int. Cl.³ .......... H04N 9/16

[52] U.S. Cl. .......... 358/64; 358/252; 358/253

[58] Field of Search .......... 358/64, 65, 66, 252, 358/253

[56] References Cited

U.S. PATENT DOCUMENTS

| | | | |
|---|---|---|---|
| 3,013,114 | 12/1961 | Bridges | 358/252 |
| 3,879,627 | 4/1975 | Robinder | 358/252 |

*Primary Examiner*—Richard Murray
*Attorney, Agent, or Firm*—Terry M. Blackwood; Richard A. Bachand; H. Fredrick Hamann

[57] ABSTRACT

A contrast enhanced color display apparatus, capable of providing a wide variety of colors, comprises a display means for emitting at least three colors and a color filter means disposed between the display means and a viewer. The color filter means has a frequency selectivity characteristic which produces more attenuation at some non-emitted color frequencies than at other emitted color frequencies.

22 Claims, 10 Drawing Figures

CONTRAST ENHANCEMENT OF MULTICOLOR DISPLAYS

The present invention relates to display apparatus, to enhancing the contrast of multicolor displays, and, in the preferred application, to enhancing the contrast of a color cathode ray tube (CRT) display.

Color CRT performance in high ambient light environments has heretofore frequently proved unsatisfactory. The reason is that much of the direct or diffused sunlight or other ambient light incident on a color CRT display is reflected from the phosphor screen, and if the reflected light is greater than the light emitted from the activated phosphors in the CRT, the information being displayed on the CRT is washed out.

Previous attempts to deal with this problem have involved the use of viewing hoods to shade the CRT screen or the use on the tube faceplate exterior of neutral density filters, i.e., filters providing a predetermined and substantially constant attenuation versus frequency. Another partial solution is provided by the black matrix CRT which uses a black or light absorbing material on the interior screen around the light emitting phosphors and thereby absorbs a great deal of the light which would otherwise be reflected back to a viewer. Still another technique is to pigment the phosphors so as to reduce their reflectivity. Also, add-on exterior filters which are somewhat transparent to two colors only have been applied with penetration type CRT's and in such application have provided some improvement in contrast but have not permitted reproduction of a wide variety of colors.

In accordance with the present invention, there is featured the simultaneous provision of contrast enhancement of tricolor displays and the capability of providing a considerable variety of colors in the visible spectrum.

Figure 1B:
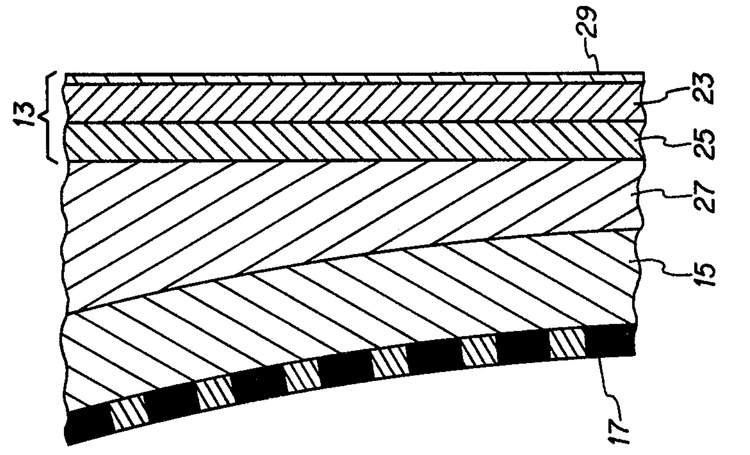
Figure 1A:
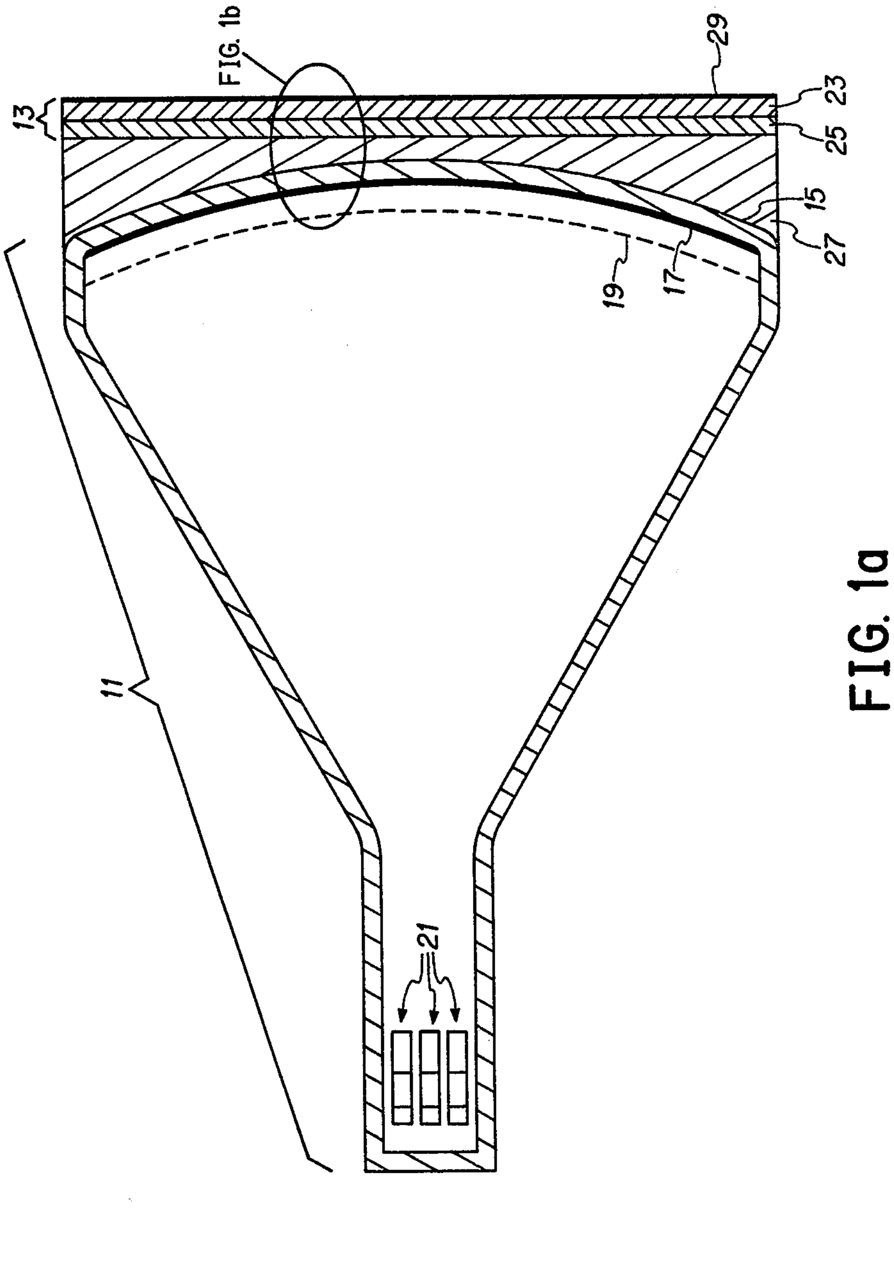
Figure 2:
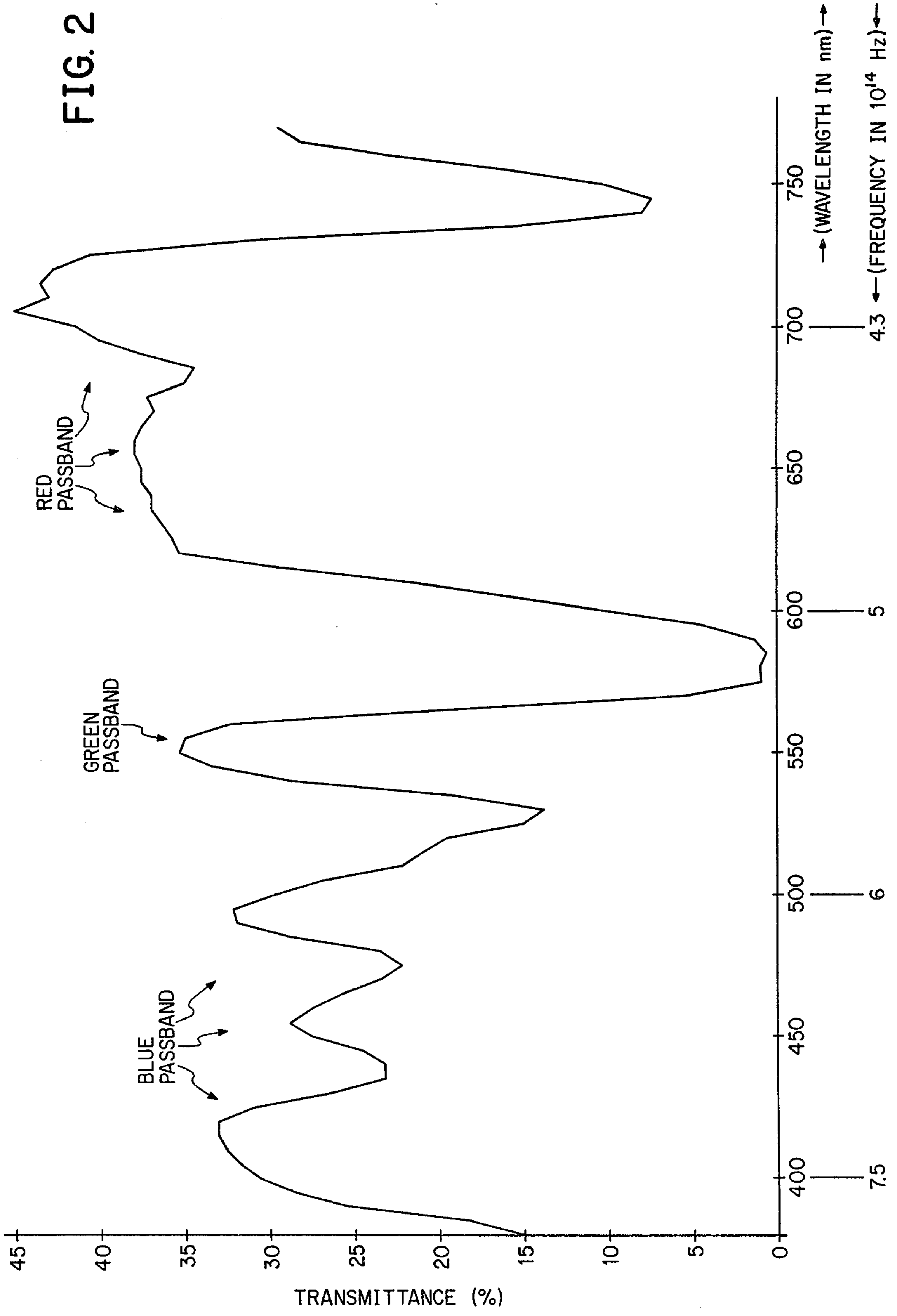
Figure 3:
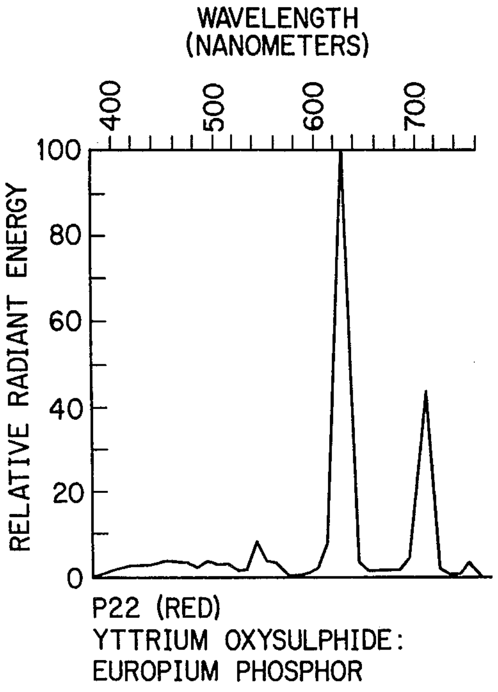
Figure 4:
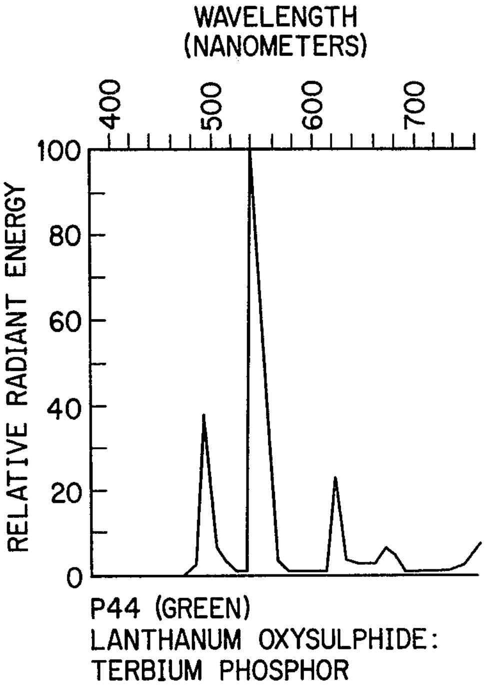
Figure 5:
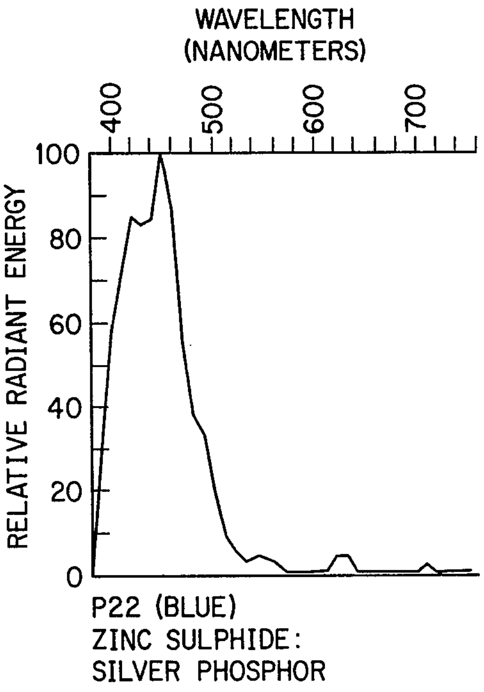
Figure 6:
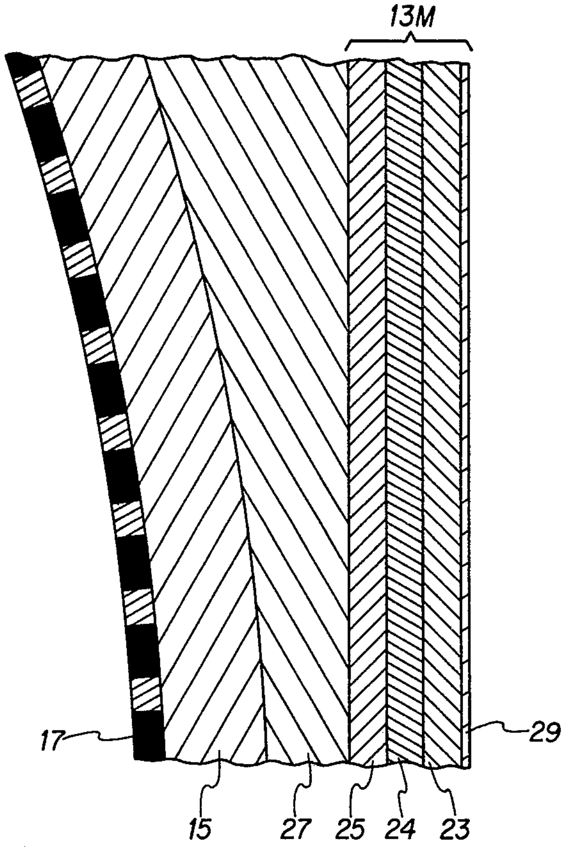
Figure 7:
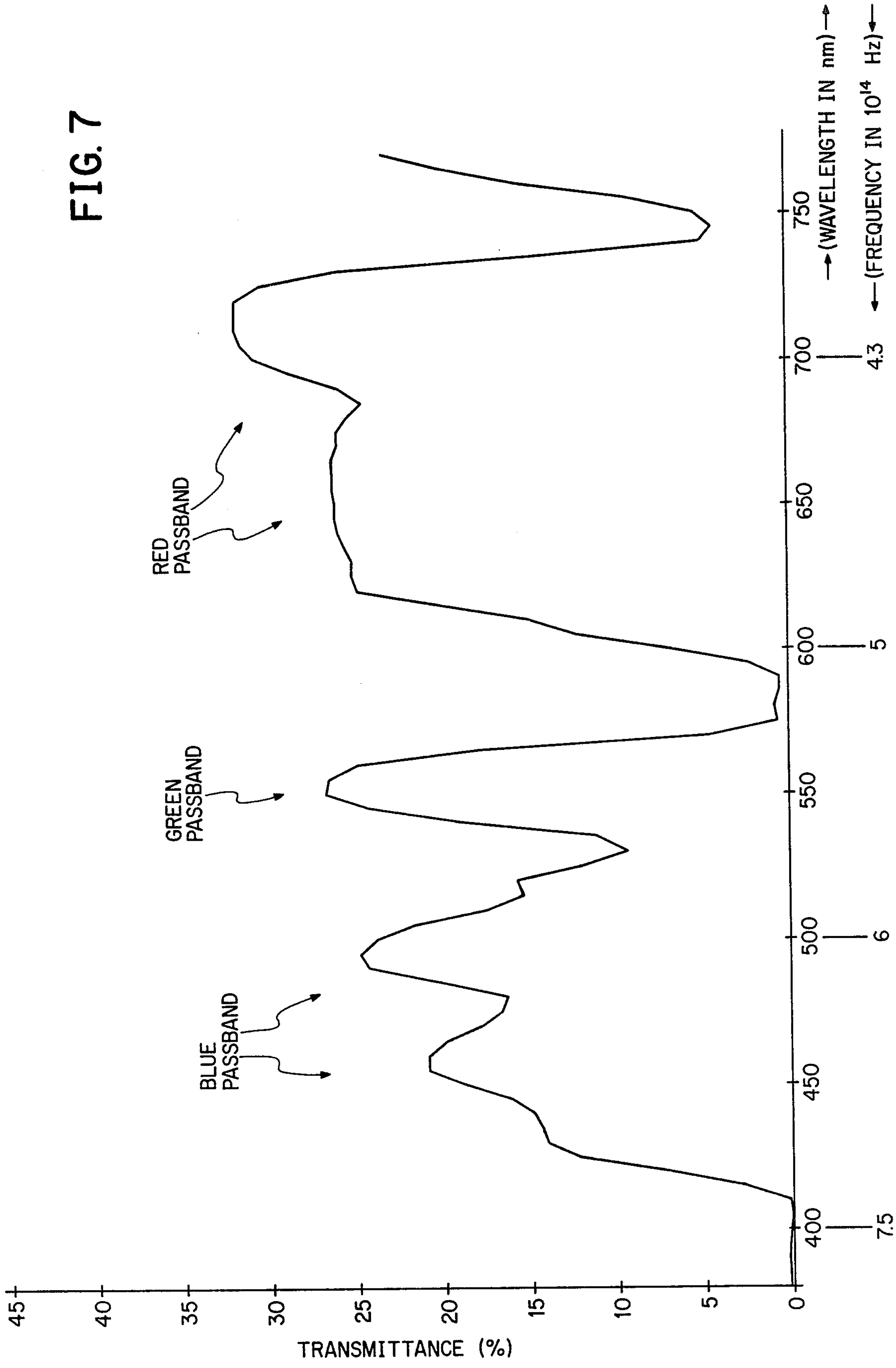
Figure 8:
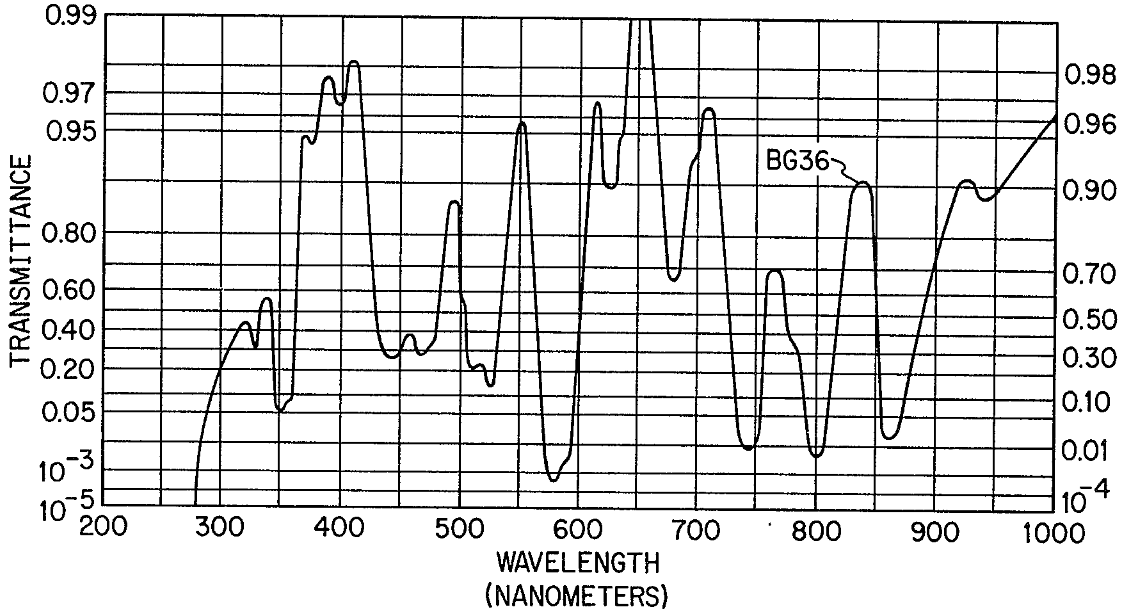
Figure 9:
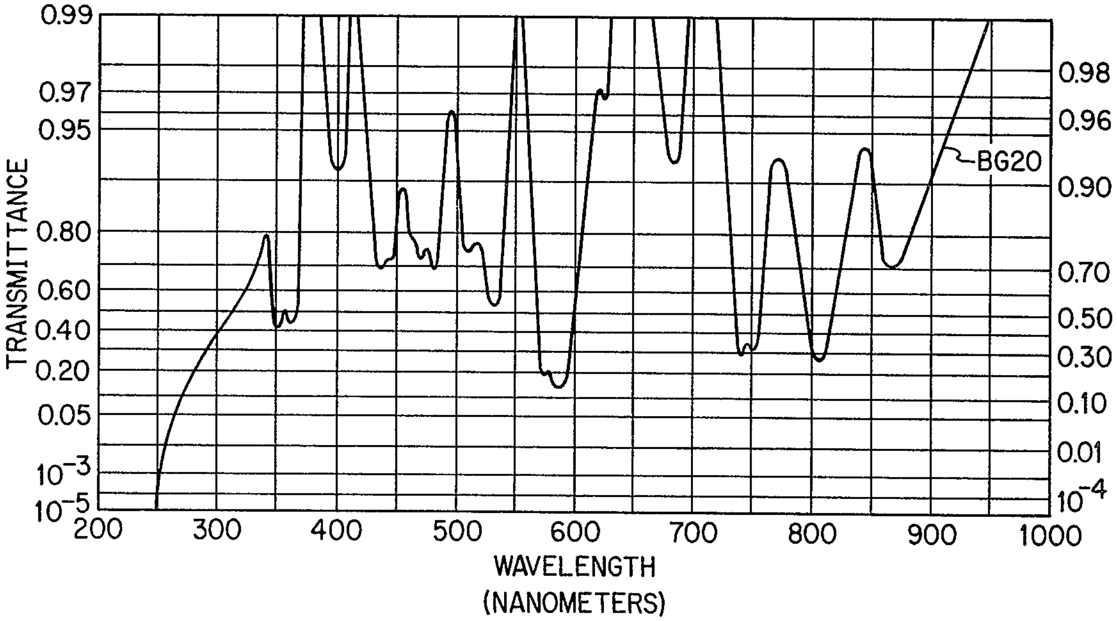

These and other features, objects, and advantages of the invention will become more apparent upon reference to the following specification, claims, and appended drawings in which:

FIG. 1*a* is a somewhat schematic side sectional view representing one presently preferred display apparatus, namely, a tricolor CRT with color filter, FIG. 1*b* is an enlarged side sectional view of a faceplate-vicinity portion of the FIG. 1*a* apparatus, FIG. 2 is a plot of transmittance versus wavelength showing the selectivity characteristic of the FIGS. 1*a,b* color filter, FIGS. 3, 4, and 5 are plots of the spectral content of the emissions of the presently preferred CRT phosphors, FIG. 6 represents another presently preferred display apparatus and is a side sectional partial view, in the vicinity of the faceplate, of a tricolor CRT with color filter, FIG. 7 is a plot of transmittance versus wavelength showing the selectivity characteristic of the FIG. 6 color filter, and FIGS. 8 and 9 are plots of transmittance versus wavelength for alternate filter materials.

Referring now to FIGS. 1*a* and 1*b*, the display apparatus represented therein comprises a tricolor CRT 11 and, disposed at the viewing side thereof, a color filter 13 having a predetermined frequency selectivity characteristic. CRT 11 is a conventional three color, three beam, shadow mask, black surround (i.e., black matrix) type of CRT. Accordingly, faceplate 15 bears on its inner surface a screen 17 comprising an array of phosphor dots (or line segments) surrounded by a black, light absorbing material. Three different phosphors are used and each emits a different one of red, green, or blue light when excited by its associated electron beam. The shadow mask 19 is perforated and appropriately aligned between electron beam sources 21 and the phosphor screen 17 to prevent excitation of any one color phosphor by either of the two non-associated electron beams. With the exception of the particular types of red-light, green-light, and blue-light emitting phosphors, about which more is to follow hereinafter, a typical CRT presently employed as CRT 11 is Sony type No. 150AKB22, Mitsubishi type No. ST1419LB22-F, or Matsushita type No. 140AXB22.

Color filter 13 comprises two flat sheets 23 and 25 of filter glass laminated together in series with an optically clear epoxy cement, such as Epotek 301. This two-glass lamination is bonded with a layer 27 of a resilient, optically clear adhesive, such as PPG Selectron 5234, to the front of CRT 11 faceplate 15, and the frontal viewing surface of such lamination is coated with an antireflective coating 29. In the presently preferred embodiment, glass 25 is a 3.42 millimeter thick piece of Schott S-8801 type of color filter glass available from Schott Optical Glass, Inc. This type of color filter glass is an ophthalmic glass and is employed in sun glasses. Equivalents are called didymium type glass.

Glass 23 is a 1.6 millimeter thick piece of the Schott NG-5 or Schott 4020 type of neutral density filter glass available from Schott Optical Glass, Inc. or Hoya Optics, Inc. The antireflective coating 29 comprises a multilayer coating of dielectric materials as supplied by Metavac, Inc. or Optical Coating Lab., Inc. or equivalent. Antireflective coating 29 reduces specular reflection at the frontal surface to 0.25% or less. The thickness of the adhesive between filter glass and CRT faceplate varies over the face of the CRT since it adapts a spherical surface to a flat surface.

In operation, a contrast enhanced display, capable of numerous colors in the visible spectrum, is perceived by the viewer. Briefly, the filter effectively controls ambient illumination which is incident on and reflected from the CRT screen, while still allowing the three primary emitted colors to be passed to the eye of the viewer. These results are achieved by the filter 13 being more transparent to the three CRT emitted colors than to non-red, non-green, or non-blue light frequencies. That is, the frequency selectivity characteristic of filter 13 contains three passbands, one to pass the frequencies of red light emitting phosphors, another one to pass the frequencies of the green light emitting phosphors, and the third one to pass the frequencies of the blue light emitting phosphors. On its path through the filter to the CRT reflecting surfaces, ambient light, such as daylight, (whose spectral distribution is typically spread throughout the visible spectrum) is considerably attenuated in the filter bandstop regions of non-red, non-green, and non-blue frequencies, and thus the overall luminance arriving at the CRT reflecting surfaces is considerably reduced. Also, the reflected luminance must pass back through the filter and is thus doubly attenuated. Meanwhile, the light emitted from the CRT, the predominance of such light lying in the passbands, is only moderately attenuated by the filter 13. In tests using simulated daylight (4700° K.) as a source, transmissibility of filter 13 has been measured to be 22.4%.

Due to bandwidth restriction having occurred on the first pass through the filter, 30% of the reflected luminance emerges from the filter on the second pass. Thus the filter 13 alone prevents [1-(0.3)(0.224)][100%]=93.28% of this source from being reflected back to a viewer. Tests have also shown the filter 13 transmissibility of emitted light from P22 phosphor, which is used in commercial television, to be 28% for zinc sulphide: silver (blue), 26% for yttrium oxysulphide: europium (red) and 26% for zinc cadmium sulphide: copper (green). Emission from P44 lanthanum oxysulphide: terbium phosphor (green) has a transmissibility of 31.2%. The resultant gain in contrast due to bandwidth restriction for the red, green, and blue P22 phosphors are, respectively, 1.16, 1.16, and 1.25. Contrast gain for the P44 green is 1.40. Gain in contrast due to bandwidth restriction is herein defined as the ratio of the contrast for a multibandpass filter over a neutral density filter with equivalent phosphor transmissibility. The P22 test data was taken using a typical high resolution, shadow mask, dot triad CRT with black matrix and tinted phosphor. The diffuse reflectance of the CRT screen was 20.4%.

FIG. 2 shows in detail the filtering action provided by filter 13 and FIGS. 3–5 show the spectral distributions of three of the above-mentioned phosphors. As may be seen from FIG. 2 several of the frequencies between the red and the green regions are attenuated considerably more than either the red or green frequencies. Also, several of the frequencies between the green and blue regions are attenuated more than either of the green or blue frequencies. Also, note that several visible frequencies above the blue region and below the red region are each attenuated more than the blue and red frequencies respectively.

In addition to the general shape of the frequency selectivity characteristic of FIG. 2, the absolute transmissibilities in percentages shown in FIG. 2 appear to be considerably optimized for high ambient light applications and thus considerably contributive to the abilities of the presently preferred embodiment. That is, the frequency selectivity or transmittance characteristic of Schott S-8801 filter glass by itself has basically the same shape as FIG. 2 but is scaled differently along the transmittance axis. FIG. 2, relative to the characteristic of a 3.42 millimeter thick piece of S-8801 glass, is reduced in transmittance at all frequencies and, more particularly, is the unaided S-8801 characteristic times a factor 0.35 to 0.40. For high ambient light conditions such as avionics applications it has been determined preferable to reduce the transmittance of this type filter glass with enough approximately constant attenuation so that at some reference point, such as the green region transmittance peak, the maximum transmittance through the combination is within plus or minus about 10% of the FIG. 2 illustrated peak of 35%. Nevertheless, a filter 13 comprising a piece of this frequency selective glass, combined with other constant attenuation values, or none at all, could provide some contrast enhancement and such a filter could be desirable in some CRT applications.

It has also been determined that the P44 green phosphor emissions are more nearly matched to, or centered in, the FIG. 2 green passband than the P22 green phosphor emissions. For this reason, it is presently expected that the preferred phosphors will comprise the two above-mentioned red and blue phosphors and the above-mentioned P44 green phosphor. Also, a P43 green, whose spectral emission is quite like the P44, is presently considered a preferred alternate. As already pointed out however, commercial television, which employs the P22 green phosphor, benefits substantially in the way of enhanced contrast from the effects of the FIGS. 1*a,b* filter 13.

To reiterate the principles, contrast enhancement is provided due to filter 13 being reasonably matched to the emissions of the three different phosphors. That is, much of the ambient light is removed or reduced in amplitude at frequencies between or adjacent the emitted frequencies. Thus the amount of ambient light reflected to the viewer is reduced considerably more than the CRT emissions. Meanwhile the capability of displaying a wide gamut of colors is maintained since each of the three primary emitted colors is permitted to pass to, and be mixed and/or integrated by, the viewer's eye.

As above indicated, FIG. 6 represents another presently preferred embodiment. Alternatively, the embodiment of FIG. 6 can be thought of as a presently preferred modification of the FIGS. 1*a,b* embodiment, and where useful for simplification and clarification, reference numerals for like items are repeated.

More particularly, except for the addition of a third filter glass 24 between glass 23 and glass 25, and the resultant modification of overall selectivity characteristic, the apparatus of FIG. 6 is identical to the hereinabove described apparatus of FIGS. 1*a,b*. Thus, modified filter 13M comprises not only the neutral density filter glass 23, the S-8801 filter glass 25, and the antireflective element 29, but also, sandwiched between 23 and 25, a filter glass 24 which is a 1.0 millimeter thick piece of Schott GG435 sharp cut filter glass. GG435 is a low-pass filter and highly attenuates all frequencies above about $7\times10^{14}$ Hz.

FIG. 7 shows in detail the filtering action provided by the FIG. 6 filter 13M. As may be seen by comparing FIGS. 2 and 7, a major effect of the additional low-pass filter glass 24 is a narrowing of the blue passband so as to provide greater attenuation of ambient light at the high frequency end of blue with only slight effects on the blue phosphor emission. It is anticipated that the contrast gain provided by the FIG. 6 filter 13M will be improved, relative to the FIGS. 1*a,b* filter 13.

A filter whose frequency selectivity characteristic obeys the FIG. 2 illustrated characteristic is herein defined as a TRCKA CRT TYPE I FILTER. A filter whose frequency selectivity characteristic obeys the FIG. 7 illustrated characteristic is herein defined as a TRCKA CRT TYPE II FILTER.

As above analogously indicated relative to the FIGS. 1*a,b* filter 13, a filter 13M comprising glasses 24 and 25 in series as shown in FIG. 6 but combined with constant attenuation other than that provided by 23, could provide considerable contrast enhancement, and such a filter could be desirable in some CRT applications.

Although the embodiments hereinabove described are presently preferred, the inventive principles herein cover several variations. For instance, tricolor displays other than cathode ray tubes are contemplated. It may also be suitable in some applications to employ three colors other than the preferred red, green, and blue. Four or more emitted colors may also be feasible. Also, due to the average eye response falling off considerably at the high frequency end of blue and at the low frequency end of red, performance satisfactory for many applications could be achieved with less than preferred attenuation at these frequencies. Also, a variety of other phosphors could be selected. Alternative candidates include:

(1) Yttrium oxide: europium (red)
(2) Yttrium vanadate: europium (red)
(3) Zinc cadmium sulphide: silver (green)
(4) Gadolinium oxysulphide: terbium (green)
(5) Zinc silicate: manganese (green)
(6) Zinc phosphote: manganese (red)
(7) Zinc sulphide: copper (green)
(8) Magnesium fluoride: manganese (red)
(9) Calcium tungstate (blue)
(10) Magnesium silicate: manganese (red)
(11) Zinc oxide and zinc cadmium sulphide: copper (blue and green)

Also, other frequency selective color filter materials having different selectivity characteristics may be employed. For instance, alternative filters may be realized by substituting, for the S-8801 glass, either BG36 type glass or BG20 type glass. Both BG36 and BG20, whose selectivity characteristics are shown in FIGS. 8 and 9 respectively, are available from Schott.

Thus, while various embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. Contrast enhanced color display apparatus comprising:

display means for (i) emitting visible light of a first color $C_1$, (ii) emitting visible light of a second color $C_2$, and (iii) emitting visible light of a third color $C_3$, $C_2$ corresponding to light frequencies between $C_1$ frequencies and $C_3$ frequencies; and color filter means, disposed between said display means and a viewer, and comprising (a) first means for providing a frequency selectivity characteristic wherein (i) at least some light frequencies between $C_1$ and $C_2$ are more greatly attenuated than light frequencies corresponding to either $C_1$ or $C_2$ and (ii) at least some light frequencies between $C_2$ and $C_3$ are more greatly attenuated than light frequencies corresponding to either $C_2$ or $C_3$, and (b) second means, arranged in series with said first means, for providing a predetermined non-zero amount of additional attenuation which is approximately constant with frequency between $C_1$ frequencies and $C_3$, frequencies.

2. Apparatus as defined in claim 1, wherein $C_1$, $C_2$, and $C_3$ are three colors from which a large variety of other visible colors can be mixed.

3. Apparatus as defined in claim 1 wherein $C_1$ and $C_3$ correspond to, respectively, lower and higher frequencies than $C_2$.

4. Apparatus as defined in claim 3 wherein said characteristic is additionally selective such that at least some light frequencies lower than $C_1$ are more greatly attenuated than light frequencies corresponding to $C_1$.

5. Apparatus as defined in claim 3 wherein said characteristic is additionally selective such that at least some light frequencies greater than $C_3$ are more greatly attenuated than light frequencies corresponding to $C_3$.

6. Apparatus as defined in claim 3 wherein said characteristic is additionally selective such that at least some light frequencies lower than $C_1$ are more greatly attenuated than light frequencies corresponding to $C_1$ and at least some light frequencies greater than $C_3$ are more greatly attenuated than light frequencies corresponding to $C_3$.

7. Apparatus as defined in claim 3 wherein $C_1$, $C_2$, and $C_3$, are respectively, red, green, and blue.

8. Apparatus as defined in claim 7 wherein said display means comprises a color cathode ray tube having red light emitting phosphors, green light emitting phosphors, and blue light emitting phosphors.

9. Apparatus as defined in claim 7 wherein said color cathode ray tube includes light absorbing material around the phosphors.

10. Apparatus as defined in claim 7 wherein the side of the color filter means nearest the viewer includes antireflective means.

11. Apparatus as defined in claim 7 wherein said green light emitting phosphor is a predetermined one of the following phosphors: P22, P43, or P44.

12. Apparatus as defined in claim 7 wherein the additional attenuation providing second means provides sufficient attenuation such that the maximum transmittance through the color filter means in the green frequency region is in the range of about 25% to 45%.

13. Apparatus as defined in claim 7 wherein said color filter means further comprises third means, arranged in series with said first means and said second means, for attenuating light according to a low-pass filter characteristic, said third means subjecting visible light frequencies above about $7 \times 10^{14}$ Hz to substantially greater attenuation than any visible light frequencies below about $7 \times 10^{14}$ Hz.

14. Light emitting display apparatus for emitting light within a visible light frequency spectrum which includes five frequency bands $CB_1$, $CB_2$, $CB_3$, $CB_4$, and $CB_5$, the higher the CB subscript number the higher the frequencies in such frequency band, said apparatus comprising:

light emitting display means for providing three different colors each located predominantly in a different one of $CB_1$, $CB_3$, or $CB_5$, and color filter means, disposed between said display means and a viewer, and comprising (a) first means for providing frequency selective attenuation such that said color filter means (i) is more transparent to frequencies in $CB_1$ and $CB_3$ than to frequencies in $CB_2$ (ii) is more transparent to frequencies in $CB_3$ and $CB_5$ than to frequencies in $CB_4$ (iii) is more transparent to frequencies in $CB_1$ than to at least some visible light frequencies therebelow, and (iv) is more transparent to frequencies in $CB_5$ than to at least some visible light frequencies thereabove, and (b) second means, arranged in series with said first means, for providing a predetermined non-zero amount of additional attenuation which is approximately constant with frequency between $CB_1$ and $CB_5$.

15. Contrast enhanced color display apparatus comprising:

a color cathode ray tube having red light emitting phosphor, green light emitting phosphor, and blue light emitting phosphor; and color filter means, disposed between said cathode ray tube and a viewer, for providing a predetermined frequency selectivity characteristic, said color filter means including (a) filter material having, between the red emission frequencies and the blue emission frequencies, approximately the same filtering characteristics as a predetermined one of S-8801 type glass, BG36 type glass, or BG20 type glass and (b) means, arranged in series with said filter material, for providing a predetermined non-zero amount of additional attenuation which is approximately constant with frequency between the red emission frequencies and the blue emission frequencies.

16. Display apparatus as defined in claim 15 wherein the additional attenuation providing means comprises a neutral density filter providing sufficient attenuation such that maximum transmittance through the color filter means in the green frequency region is in the range of about 25% to 45%.

17. Apparatus as defined in claim 15 wherein said green emitting phosphor is a predetermined one of the following phosphors: P22, P43, or P44.

18. Apparatus as defined in claim 15 wherein said color filter means includes a low-pass color filter, arranged in series with said filter material, for providing substantially more attenuation at frequencies above about $7\times10^{14}$ Hz than at frequencies below about $7\times10^{14}$ Hz.

19. Contrast enhanced color display apparatus comprising:

a color cathode ray tube having red light emitting phosphor, green light emitting phosphor, and blue light emitting phosphor; and color filter means, disposed between said cathode ray tube and a viewer, for providing substantially the same frequency selectivity as that provided by a predetermined one of a TRCKA CRT TYPE I FILTER or a TRCKA CRT TYPE II FILTER.

20. For use with a CRT having red light emitting phosphors, green light emitting phosphors, and blue light emitting phosphors, a color filter comprising first and second components arranged in series, said first component comprising a material having a frequency selectivity characteristic approximately the same as S-8801 type glass, and said second component comprising a low-pass filter material which attenuates visible light frequencies above about $7\times10^{14}$Hz more than visible light frequencies below about $7\times10^{14}$ Hz.

21. Apparatus as defined in claim 20 and including a third component arranged in series with said first and second components, said third component comprising means for providing a predetermined non-zero amount of additional attenuation which is approximately constant with frequency between frequencies corresponding to the red light emissions and frequencies corresponding to the blue light emissions.

22. Apparatus as defined in claim 21 and including a fourth component located on a predetermined side of said color filter, said fourth component comprising antireflective means.

* * * * *